US009538160B1

(12) United States Patent
Cole

(10) Patent No.: US 9,538,160 B1
(45) Date of Patent: Jan. 3, 2017

(54) IMMERSIVE STEREOSCOPIC VIDEO ACQUISITION, ENCODING AND VIRTUAL REALITY PLAYBACK METHODS AND APPARATUS

(71) Applicant: Next3D, Inc., Atlanta, GA (US)

(72) Inventor: David Michael Cole, Pembroke Pines, FL (US)

(73) Assignee: NEXTVR INC., Newport Beach, CA (US)

( * ) Notice: Subject to any disclaimer, the term of this patent is extended or adjusted under 35 U.S.C. 154(b) by 325 days.

(21) Appl. No.: 14/093,466

(22) Filed: Nov. 30, 2013

Related U.S. Application Data

(60) Provisional application No. 61/810,883, filed on Apr. 11, 2013.

(51) Int. Cl.
*H04N 13/02* (2006.01)

(52) U.S. Cl.
CPC .................................. *H04N 13/0239* (2013.01)

(58) Field of Classification Search
CPC ......................... H04N 13/0239; H04N 13/0296
See application file for complete search history.

(56) References Cited

U.S. PATENT DOCUMENTS 9,256,069 B2 * 2/2016 Wada ................. G02B 27/0093
2005/0093773 A1 * 5/2005 Kuroki ..................... G09G 3/20 345/30
2008/0174659 A1 * 7/2008 McDowall ............. H04N 5/265 348/53
2009/0284585 A1 * 11/2009 Tsai .................. H04N 1/00129 348/48
2011/0023066 A1 * 1/2011 Jang .................. H04N 13/0048 725/54
2011/0285825 A1 * 11/2011 Tian ....................... H04N 9/646 348/47
2012/0120186 A1 * 5/2012 Diaz .................... H04N 5/2258 348/36
2012/0162209 A1 * 6/2012 Tsai ................... H04N 13/0007 345/419
2012/0327178 A1 * 12/2012 Hines ....................... H04N 7/15 348/14.08
2013/0156295 A1 * 6/2013 Kerbiriou .......... G06K 9/00201 382/154

* cited by examiner

*Primary Examiner* — Dave Czekaj
*Assistant Examiner* — M D Haque
(74) *Attorney, Agent, or Firm* — Michael P. Straub; Stephen T. Straub; Ronald P. Straub

(57) ABSTRACT

Methods and apparatus for capturing and displaying stereoscopic images are described in a manner that allows a user to obtain a 3d virtual reality experience simulating that of being in a seat at a football game or other event. Rear images are modified, e.g., in luminance intensity, to make them consistent with the luminance intensity of the forward images to avoid or reduce edges or differences in luminance intensity as a users turns his head from viewing a main image area to a side or rear image area. A seamless 3D presentation is made possible through the use of fisheye lenses at capture time and combining of images corresponding to forward and rear image areas as a user turns his or her head requiring a change in the captured image area which is displayed to the user.

21 Claims, 10 Drawing Sheets

1000
START METHOD OF PROVIDING STEREOSCOPIC CONTENT 1002
1004 MAKING DEPTH MEASUREMENTS OF AN AREA SURROUNDING A MOUNT ON WHICH CAMERAS USED TO CAPTURE LEFT AND RIGHT IMAGES CORRESPONDING TO A FIRST VIEWING DIRECTION ARE MOUNTED
MAKE LIDAR MEASUREMENTS 1005
1006 CAPTURE LEFT AND RIGHT IMAGES CORRESPONDING TO THE FIRST VIEWING DIRECTION
1007 USE A FIRST AND A SECOND CAMERA, SPACED APART FROM ONE ANOTHER BY A PREDETERMINED AMOUNT, TO CAPTURE THE LEFT AND RIGHT IMAGES CORRESPONDING TO THE FIRST VIEWING DIRECTION, SAID FIRST AND SECOND CAMERAS INCLUDING FISH EYE LENSES
1008 CAPTURE LEFT AND RIGHT IMAGES CORRESPONDING TO A SECOND VIEWING DIRECTION WHICH IS DIFFERENT FROM THE FIRST DIRECTION
1010 GENERATE A DEPTH MAP FOR THE AREA SURROUNDING SAID MOUNT
ENCODE CAPTURED IMAGES 1014
1012 DEPTH MAP INFORMATION
1016 DECODE IMAGE DATA
1018 TRANSMIT ENCODED IMAGE DATA
1020 TRANSMIT DEPTH MAP INFORMATION WITH AT LEAST SOME IMAGE INFORMATION CORRESPONDING TO AN IMAGE CAPTURED BY A CAMERA ON THE MOUNT
1022 GENERATE A 3D IMAGE BASED ON AT LEAST A PORTION OF ONE OF THE LEFT AND RIGHT IMAGES CORRESPONDING TO THE FIRST DIRECTION AND A PORTION OF ONE OF THE LEFT AND RIGHT IMAGES CORRESPONDING TO THE SECOND DIRECTION
1024 DETERMINE A LUMINANCE OF A PORTION OF AN IMAGE IN THE FIRST VIEWING DIRECTION
1026 ADJUST A LUMINANCE OF A PORTION OF AN IMAGE IN THE SECOND VIEWING DIRECTION BASED ON THE LUMINANCE OF THE PORTION OF THE IMAGE IN THE FIRST VIEWING DIRECTION
1028 USE THE DEPTH MAP INFORMATION WHEN GENERATING A 3D IMAGE FROM ONE OR MORE IMAGES CAPTURED BY A CAMERA ON SAID MOUNT
1030 DISPLAY 3D IMAGE CONTENT

IMMERSIVE STEREOSCOPIC VIDEO ACQUISITION, ENCODING AND VIRTUAL REALITY PLAYBACK METHODS AND APPARATUS

RELATED APPLICATIONS

The present application claims the benefit of U.S. Provisional Patent Application Ser. No. 61/810,883 filed Apr. 11, 2013 which is hereby expressly incorporated by reference in its entirety.

FIELD

The present invention relates to the field of stereoscopic imagery and more particularly, to acquiring, encoding and decoding orthogonally accurate stereoscopic video and/or modifying stereoscopic video for presentation such that it is represented to viewer within a realistic orthogonal space.

BACKGROUND OF THE INVENTION

Conventional stereoscopic video presentation is accomplished by displaying content on a monitor screen or projected surface, which remains unreactive to the position of or point-of-view of the viewer. This creates a synthetic, static window onto the recorded video content that in no way approximates the effect of being immersed in the recorded scene. In other words, the conventional technique for stereoscopic presentation serves as a window onto what was recorded but is not a replica of the environment that the camera was pointed at as it acquired the scene.

In view of the above, it should be appreciated that there is an application for a stereoscopic video acquisition, transmission and display system that can provide the viewer with an immersive representation of the acquired scene that more fully satisfies the viewer's sensory requirements for being real.

SUMMARY

Methods and apparatus for capturing and displaying stereoscopic images are described. In various embodiments first and second cameras which are spaced apart from one another are used to capture first and second images, referred to as left and right images, respectively. In at least some embodiments the cameras are mounted at the same height relative to the horizontal with a predetermined fixed distance between them, e.g., a distance in the range of 105 to 120 mm in some embodiments with 117 mm center to center spacing between the center of the lenses of the first and second cameras being used in one particular exemplary embodiment. Other distances are also possible. Thus, while the intraocular distance of humans is, on average, approximately 62 mm, the distance between the cameras is intentionally set about twice that distance. Transforms can, and in some embodiments are, used based on the known distance when generating 3D images intended to be viewed by an average person with a different eye spacing than the distance between the cameras. Such transforms are known in the art. In at least some embodiments the first and second cameras include fish eye lenses which capture a 180 degree or nearly 180 degree field of view.

The first and second cameras are mounted on a support rig or structure which faces in a first direction and captures what may and sometime is referred to as a forward view. The front or forward view is normally the area of main action, e.g., a football field area where the players are located. This is where a user will normally focus his/her attention. However, a user, e.g., viewer of a 3D image generated in accordance with the invention, may turn his head left or right. While this may occur infrequently, to support a true 3d immersion experience it is important that views beyond the 180 degree frontal field of view be supported. As should be appreciated seeing a screen border or dark field when turning left or right to an image area beyond 180 degrees of the frontal view can cause a user to loose his or her sense of immersion in the simulated 3D environment generated in accordance with various embodiments.

To facilitate a more complete 3D experience than can be achieved using simply forward facing cameras, rear and/or side images are captured. In some embodiments the rear and/or side images are captured at a much lower rate than the forward facing images which are captured at a normal video frame rate. In some embodiments 180 degree or nearly 180 degree rear facing images are captured by using the first and second cameras in a rear facing position, e.g., prior to capture of the forward facing images. The rear facing left and right images are stored and/or transmitted to a receiver for use in the event that a user turns in a direction requiring display or a portion or all of a rear facing image and can be combined with a portion of the forward facing image. By stitching together a portion of the forward and rear facing images, for display to a user, a seamless image can be presented regardless of how far left or right a user turns his/her head while viewing a 3D image generated in accordance with the invention.

While the first and second cameras, e.g., high resolution cameras can and are used in some embodiments to capture a rear area image, e.g., prior to capture of the image in the forward image area, in other embodiment one or more rear facing cameras, e.g., with 180 degree fish eye lenses, are used to capture images of the rear image area behind the forward facing cameras which may be of higher resolution. The image capture rate maybe, and in some embodiments is, lower than the capture rate of the main forward facing images. Since the rear image area, e.g. images of a crowd behind a seat location where the camera assembly including the forward looking cameras changes less frequency or is of lower importance than the image in the main image, the lower frame rate and/or resolution of the rear images is often not significant in terms of the overall quality of the 3d viewing experience.

As such be appreciated, since the forward and rear captured images will often correspond to different points in time, sometimes hours apart, different lighting conditions may be present at the time the forward images are captured as compared to the lighting at the time the rear images are captured. Also the passing of a cloud may have an effect on the brightness of a field being captured by the forward looking cameras while the cloud may not have been present at the time the rear facing image was captured.

In accordance with at least one embodiment priority is given to the forward looking image and when a portion of a forward image is combined with a rear image portion for display, the rear image portion is subject to luminance adjustments based on the forward image portion with the luminance of the forward image portion being given priority over the luminance of the rear image portion. Thus, a rear image portion may be and sometimes is brightened when combined with a forward image portion that is brighter than the rear image portion. Similarly if the forward image portion is darker than the rear image portion the luminance of the rear image portion is adjusted, e.g., reduced, based on the luminance of the forward image portion. Thus, at the time of playback or encoding for transmission to a playback device the rear image portion is subject to a luminance adjustment so that differences in luminance are minimized or reduced between the forward image portion and rear image portions which are combined with the forward image portion controlling the overall luminance level. Thus at presentation time, the brightness of the forward and rear image areas will be similar regardless of the time difference between when the forward and rear images were captured.

In addition to capturing image data using a stereoscopic camera rig with at least two forward facing cameras, audio may be captured to provide a life like stereo experience with left and right microphones (mics) facing to the side of the first and second cameras thereby capturing audio with the mics positioned in the general location human ears would be positioned on the side of a humans head relative to the position of the first and second cameras which are forward facing as a human being's eyes would be. In some but not necessarily all embodiments the mics are attached or mounted to a ear shaped assembly which is intended to direct audio signals to the mics in the same way an ear would direct audio signals to the inside of a human ear.

In some embodiments a depth scan of a stadium or other location is performed using LIDAR. A depth map is created and the depth information is communicated to the playback device which can then use the information in reconstructing images during playback. The range information can be used in combining forward and rear images during playback, e.g., to insure that realistic depth is simulated in the 3D images presented to a user.

While a single camera/audio capture rig may be used, rigs may be positioned in a stadium at predetermined locations. For example, in a football stadium one rig may be located near the mid field line and other camera/audio capture rigs at other locations such as the end zones of a football field. In at least some such embodiments a user can switch between content streams from different camera rigs thereby modifying the perception of the user's location in the stadium while maintaining a 3D viewing experience. The switching of content feeds from one camera rig to another may, and in some embodiments does, simulate a user changing seats in a stadium.

The camera rigs can easily be situated in the place of one or more seats at a stadium allowing for a user to select what appears, during the playback experience, as different seat locations.

While described in the context of a stadium application the methods and apparatus of the present invention can be used to provide a 3D experience corresponding to many different locations where a camera rig may be located. Wireless cameras and signal transmission may be used for locations where wired embodiments are not well suited.

Various embodiments of the present invention utilize a specially designed video camera configuration, a chart-based calibration method, and/or a binaural microphone to acquire an orthogonally accurate spatial representation of the scene where the camera is pointed. Various features of the invention then utilize the acquired/recorded information to build a representation of the depth of the recorded scene. Visually redundant data reduction techniques may and sometimes are used to encode the recorded depth of the recorded scene and video information into a highly efficient digital transport stream. Decoding of the transport stream, e.g., at an end-user's location, is performed allowing a viewer to view a portion of the entire recorded scene within a virtual reality head-mounted display. The portion of the scene displayed is updated based on the yaw, pitch, roll and (optionally) x, y, z spatial position of the viewer's head which may, and in some embodiments are, monitored by sensors on the head mounted display.

In some embodiments the scale, scene geometry, stereoscopic parallax and convergence point are calculated such that the viewer experiences an orthogonal view of the transmitted scene which is or maybe an exact orthogonal view of the transmitted scene. In at least some embodiments, a binaural audio transmission accompanies the video to augment the psychological sense of reality. Computer graphic information may be, and sometimes is, overlaid upon the orthogonal view to augment the viewer experience. For example, a computer-generated score board can be inserted into the view to provide real-time scores for a sporting event that the viewer is watching. Because the system is aware of which portion of the entire scene the viewer is looking at, the overlaid information can be, and sometimes is, contextually adapted to the current view. For example, in some embodiments, a digital billboard begins to play a video advertisement when a viewer rests their gaze on it. In some embodiments, multiple camera views are aggregated within a spatially accurate 3 dimensional representation of the recorded environment such that the viewer can shift their POV (point of view) from one camera perspective to another, e.g., by providing user input through an input device indicating a preferred or user selected viewing position.

DETAILED DESCRIPTION

FIGS. 1-7 illustrate various steps and/or apparatus which are part of one or more exemplary methods and/or apparatus implemented in accordance with the invention. One or more of the methods relate to acquiring, encoding, transmitting, decoding and displaying orthogonally accurate stereoscopic video and/or modifying stereoscopic video for presentation such that it is presented to viewer within a realistic orthogonal space. The stereoscopic video includes multiple images which are generated and displayed over a period of time with the displayed portion of one or more originally captured images being dependent on the user's, e.g., viewer's head position at the time of viewing.

Figure 1:
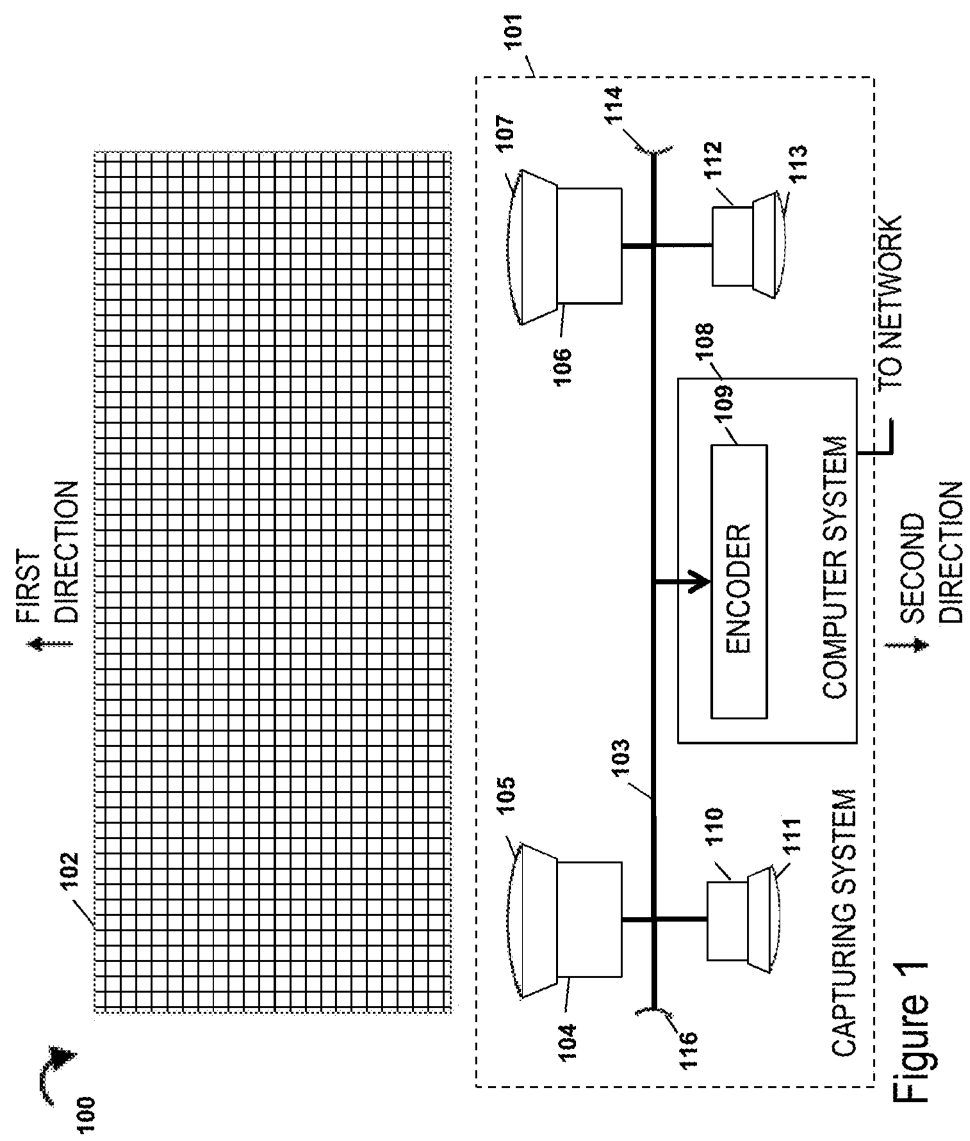
FIG. 1 illustrates an exemplary stereoscopic image capturing system including a computer system with encoding capability along with preview support allowing an operator to decode and display encoded image data.

FIG. 1 is a drawing 100 illustrating an exemplary stereoscopic image capturing system 101 and a calibration grid 102 that may be used in calibrating the system 101. FIG. 1 illustrates the orthogonal calibration of the system such that images corresponding to calibration chart 102 are acquired with carefully controlled positioning of both the chart 102 and the cameras 104 and 106. This step facilitates proper rendering of the orthogonal space to the viewer as images are subsequently captured for encoding, transmission and subsequent decoding and display.

As shown the capturing system 101 includes a set of cameras including first and second front cameras 104 and 106 facing a first direction, and a set of rear end cameras 110 and 112 facing a second direction, with the cameras being mounted on a mount assembly 103 as shown. In some embodiments the mount assembly 103, and cameras mounted thereon, can be rotated. In the illustrated embodiment each of the cameras include fish eye lenses to acquire wide panoramic or spherical images. The lenses allow, in some embodiments, the cameras to capture a 180 degree or approximately 180 degree field of view.

For example camera 104 includes a fish eye lens 105, camera 106 includes a fish eye lens 107, rear camera 110 includes a fish eye lens 111 and rear camera 112 includes a fish eye lens 113. The forward facing cameras 104, 106 are, in some embodiments, high resolution cameras which will be used for capturing the main action, e.g., the forward facing images such as that of a football field where the action is occurring. Rear facing cameras, i.e., cameras 110, 112 are optional and, in some embodiments, are lower resolution cameras than forward facing cameras 105, 105.

While forward and rear images may be captured on an ongoing basis, the rear image is generally less important than the image area captured by the main cameras 104, 106. In at least some embodiments images are captured and/or encoded and transmitted by cameras 104, 106 at a higher rate, e.g., frame rate, than the rate at which images are captured and/or transmitted by cameras 110, 112. This is because data transmission priority is given to the forward facing cameras given that a viewer is not likely to frequently turn to the rear or side during an event such as a sporting event and thus priority is given to a user's most likely area of focus for purposes of use of limited data transmission capability particularly in the case of live or nearly live events such as football or other sporting events where images may be captured and transmitted in real time while a game is ongoing to give a user the sense of being present at the stadium or location where the image is being captured.

In some implementations the rear end cameras 110 and 112 are not included and the forward facing cameras 104, 106 are rotated and used to capture a rear view at one or more points in time. The use of the cameras 104, 106 to capture images in the second, e.g., rear, direction prevents their use to capture images in the first, i.e., forward direction. The cameras 104, 106 can be used to capture the images in the second, e.g., rear direction, relative to a seat or other location at which the mount 103 is positioned, before the action of a game, during commercial breaks and/or at other times when play or other activity to be captured is not going on in the first direction, e.g., the direction of a football field, stage or other area where the main action to be captured is to occur. In such cases, it should be appreciated that images captured in the second direction will correspond to a different time than images captured in the first direction with which they may be combined during playback.

The fish eye lenses capture an image corresponding to a 180 degree viewing area or approximately a 180 degree viewing area. In some embodiments one or no rear facing cameras are is included and mounted on the support 103. In some embodiments the first and second cameras 104, 106 are spaced apart from one another by a predetermined amount which is known and can thus be used when rendering 3D images to be displayed to a user who may have an interocular distance different than distance two cameras, e.g., as may be expressed as a center of lens to center of lens distance in some cases.

The capturing system 101 further includes a pair of microphones 114 and 116 to acquire audio signals, and a computer system 108 which may be in some embodiments to perform processing including encoding, storage, transmission and/or output of the captured stereoscopic content in accordance with the invention. Ear shaped elements may be mounted around the microphones 114 and positioned so as to simulate the position of human ears and how they would direct audio signals into the left and right ears of a human being. Thus, in at least some embodiments microphones are placed in ear shaped acoustic directing devices and are mounted on the side of mount 103 or side of camera 104, and right side of mount 103 or camera 106. The computer system includes, among other elements, an encoder 109 which is used for encoding the acquired stereoscopic images, a decoder for decoding the encoded content and a stereoscopic display device which can be used to preview encoded content. The computer system 108 may also include a transmission module for transmitting encoded content as will be discussed further below.

Figure 2:
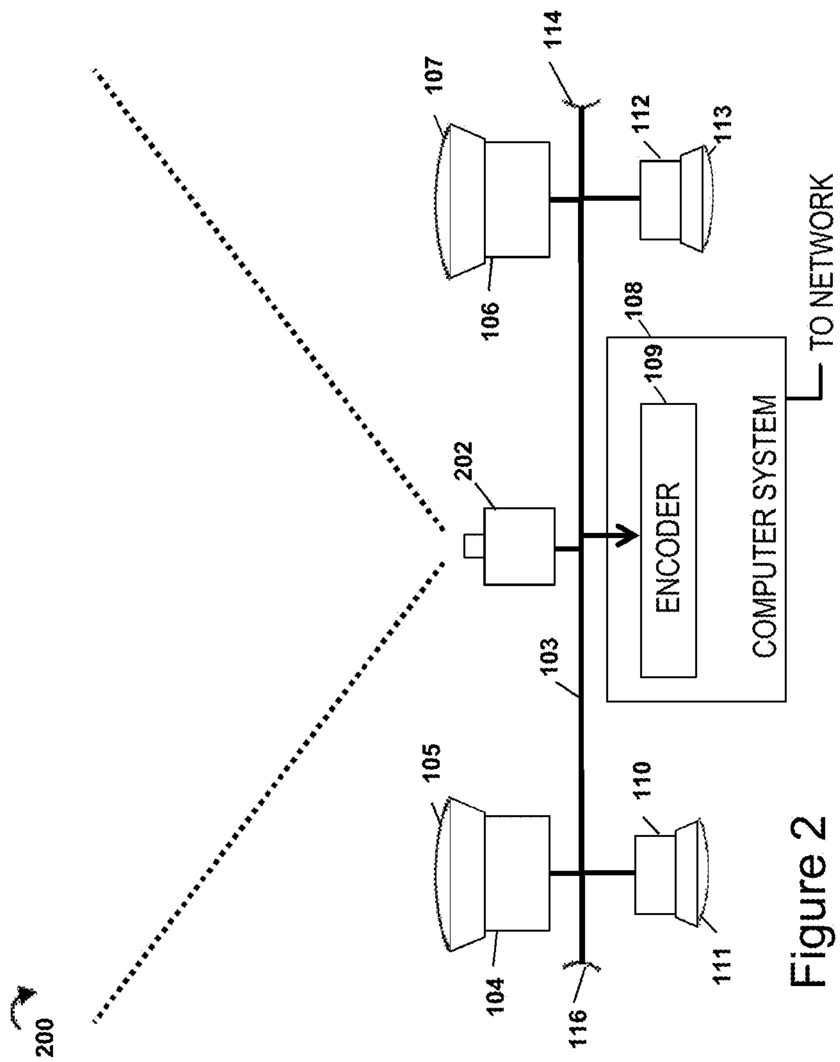
FIG. 2 illustrates an image capture system in the process of acquiring scene depth data, e.g., using LIDAR, in accordance with an exemplary embodiment of the invention using an exemplary stereoscopic image capturing system.

FIG. 2 is a drawing 200 illustrating an optional step of acquiring additional scene depth data. In some embodiments, a distance measuring device 202, e.g., a laser interferometry device, is used to calculate depth map of the scene of interest being acquired. LIDAR (Light Detection And Ranging) scanning or other optical range finding techniques may, and in some embodiments, are used to acquire depth data of the scene. The depth measurements may be take at a time other than the time video is captured and encoded. For example a depth map of a stadium may be made by the system prior to a football game. The depth information can be used in encoding and/or rendering 3D images from images captured during a game or at other times. The depth information can be used in combination with an image corresponding to a left or right eye view and processing at playback time to generate an eye view for an eye which did not have an image transmitted or from a single image in the case where one of the left and right eye images is either not transmitted or is lost in transmission.

In some such embodiments a laser 202 shown in the figure is used to direct a laser beam for scanning the target scene area in order to generate parameters and data that can be used for calculating a depth map of the viewing area.

Figure 3:
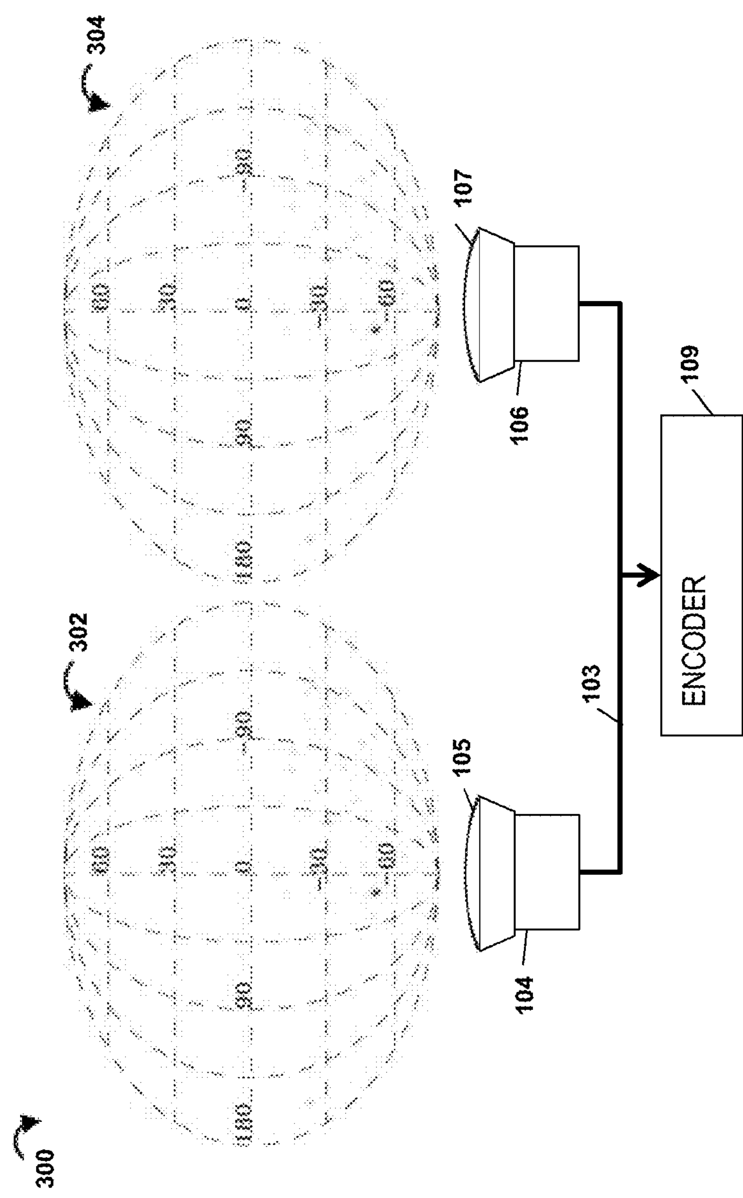
FIG. 3 illustrates an acquisition step showing the acquisition of a stereoscopic 180-degree field-of-view (FOV) from two specially configured video cameras included in the capturing system of FIG. 1 and/or FIG. 2, in accordance with an exemplary embodiment of the invention.

FIG. 3 is a drawing 300 illustrating the acquisition of a stereoscopic 180-degree field-of-view from the two video cameras 104, 106. Importantly, at least in some embodiments, video cameras acquire video at a resolution and frame-rate sufficient to provide the downstream virtual reality head-mounted display device with adequate resolution and temporal refresh to satisfy the requirements of the system to create an illusion of a real world to the viewer. The two cameras 104, 106 acquire spherical stereoscopic view. The two spheres 302, 304 are shown to illustrate ideal spherical projections of the areas captured by the cameras 104, 106. Thus in an ideal spherical stereoscopic view captured by the cameras, the captured area will cover 180 degrees horizontally while covering 90 degrees vertically as illustrated in FIG. 3 by drawings 302, 304. In reality despite the use of fisheye lenses the captured images may be somewhat distorted but processing can be used to correct and/or compensate for known aberrations from the desired image capture pattern since may of the distortions will be known since they are attributable to measurable physical characteristics of the optics and/or other components of cameras 104, 106.

Figure 4:
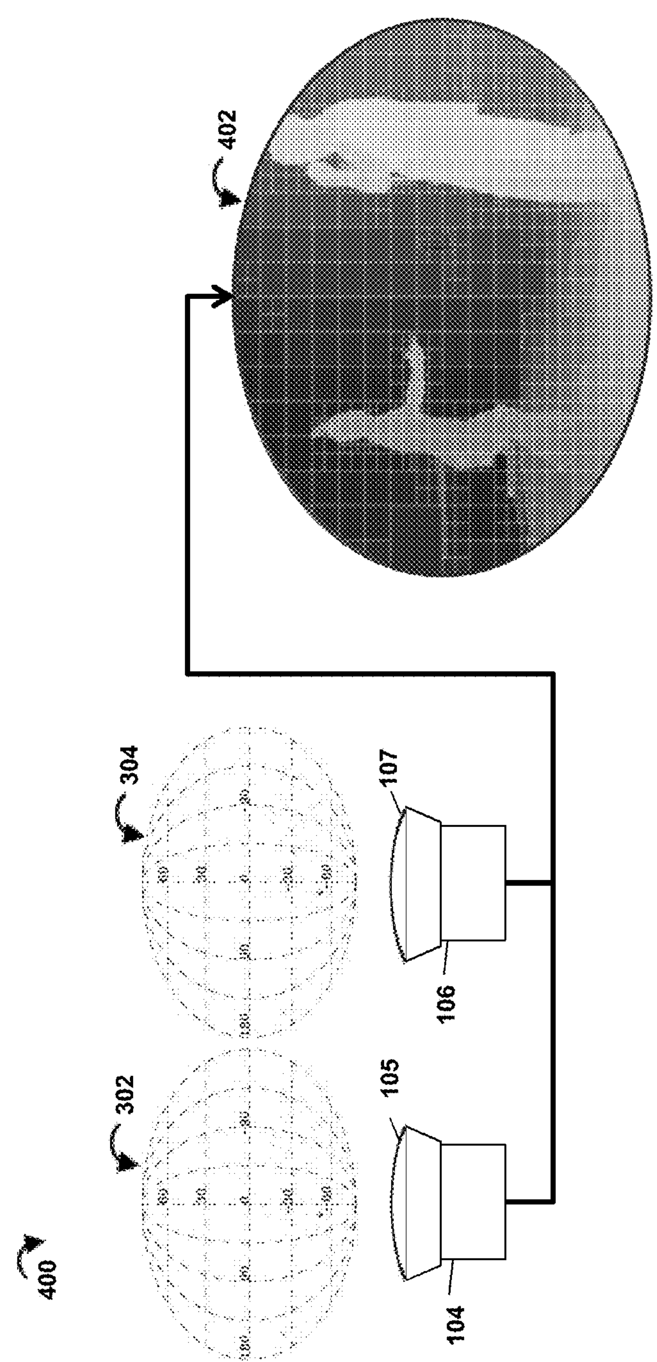
FIG. 4 illustrates the application of stereoscopic images and optional surface mapping data to calculate a frame-by-frame depth-map of scene in accordance with an exemplary embodiment of the invention.

FIG. 4 is a drawing 400 illustrating a step involved in the processing of acquired stereoscopic content where the stereoscopic images and optional surface mapping data is used to calculate a frame-by-frame depth-map of scene 402. In some embodiments the calculated frame-by-frame depth-map of the scene 402 is transmitted in a frame-accurate method along with the image data. The image data and/or depth map information may, and in some embodiments is, compressed using various encoding techniques prior to transmission.

Figure 5:
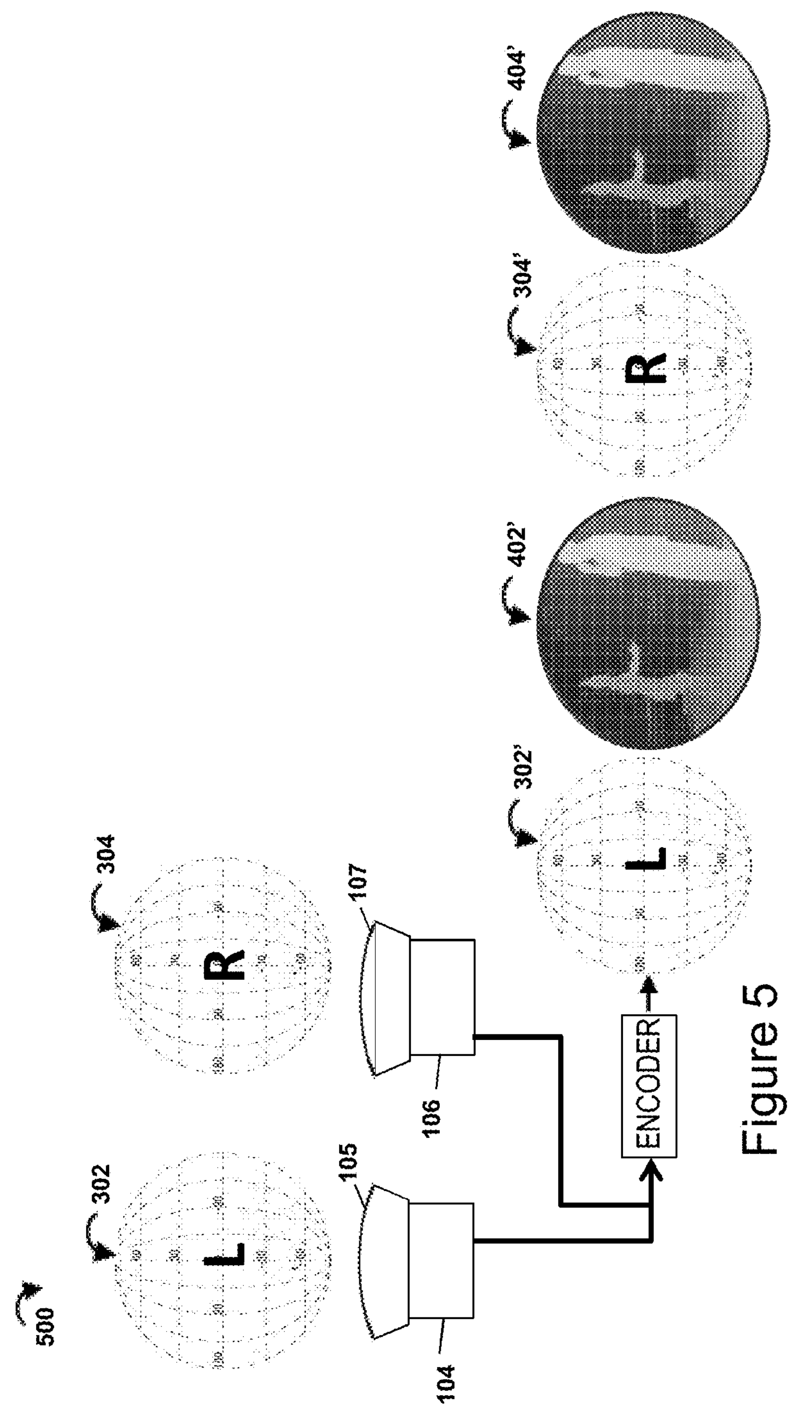
FIG. 5 illustrates the step of encoding of the stereoscopic video in accordance with an exemplary embodiment of the invention.

FIG. 5 is a drawing 500 illustrating exemplary encoding of the stereoscopic video from the system. In some embodiments a 3D encoding method, e.g., a differential encoding method where differences between left and right eye images are taken into consideration as part of the encoding process, is used to perform encoding of the stereoscopic data. However, other encoding techniques may be used. Depth information may optionally be used in some embodiments to eliminate the need to transmit one eye view of the stereoscopic pair of images, e.g., a left image 302 or right image 304 may be omitted with a single eye view and depth map information being communicated. Thus in some embodiments one of the stereoscopic images out of the pair 302, 304 is encoded and transmitted along with the corresponding frame accurate depth map. In the example of FIG. 5, it is illustrated that encoding is performed on the acquired stereoscopic image pair 302, 304 and the corresponding frame accurate depth maps, e.g., depth map 402 as produced by the processing illustrated in FIG. 4. Consider that the processing performed in FIG. 4 produces frame accurate depth maps 402', and 404' corresponding to stereoscopic images 302 and 304. The encoder 108 performs encoding on the stereoscopic image pairs 302, 304 and the corresponding frame accurate depth maps 402, 404 to produce encoded image data 302', 304' and encoded depth map data 402', 404'.

Figure 6:
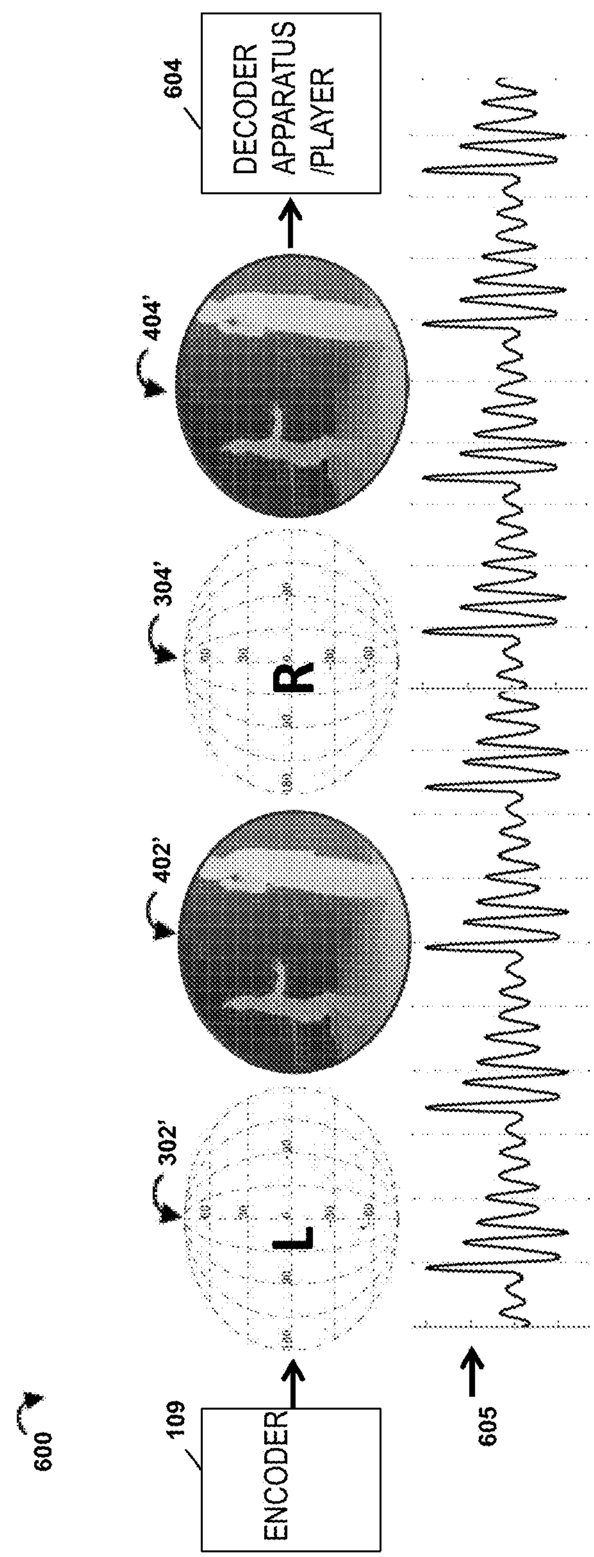
FIG. 6 illustrates transmission of captured and encoded image data representing stereoscopic video and which may include frame-accurate depth maps and/or binaural audio transmitted in accordance with one or more exemplary embodiments of the invention.

FIG. 6 illustrates the communication and transmission, e.g., as a signal 605, of stereoscopic video which may include frame-accurate depth maps, and/or binaural audio that is transmitted after being output bye an encoder 109 and transmitted over a communication channel, e.g., cable, satellite or other network, to decoder 604 which may, and normally is, located at a customer premise location such as a residential home where a playback device may be located. In at least some embodiments the decoder is part of a playback apparatus 604 which includes or is coupled to a head mounted display device with head position tracking capability. In come embodiments the head mounted display is an OCULUS RIFT virtual reality headset available form OCULUS VR™.

Figure 7:
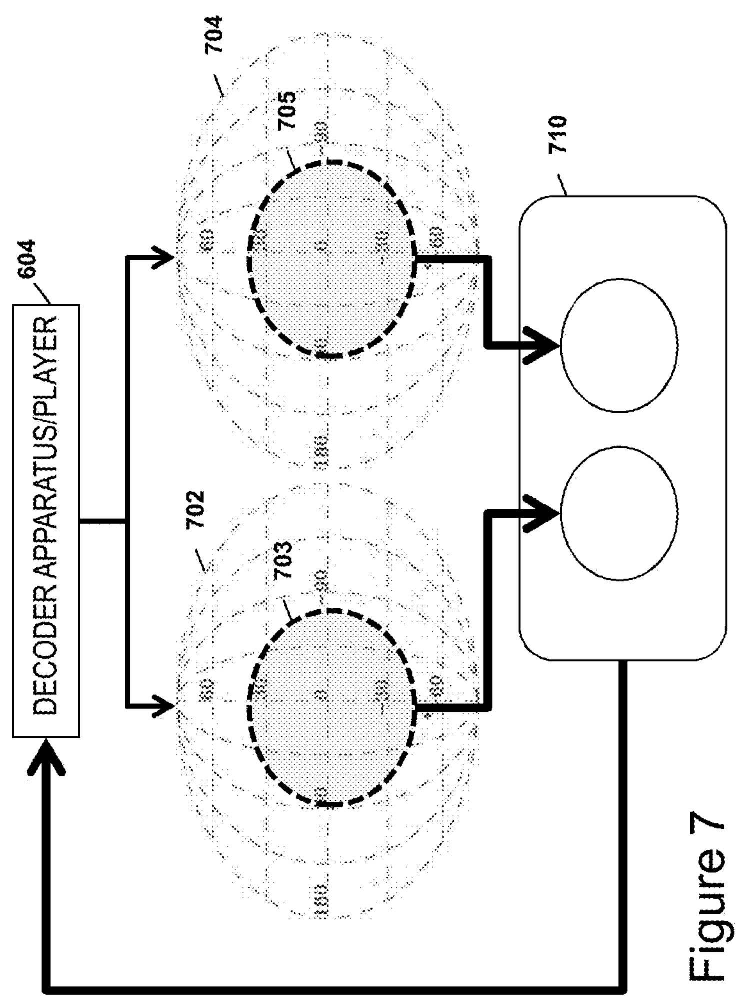
FIG. 7 illustrates the step of decoding and visualization of the immersive stereoscopic video in accordance with an exemplary embodiment of the invention with head angle position information being used to determine the portion of the captured image data which will be presented to a user.

FIG. 7 illustrates the decoding and visualization of the immersive stereoscopic video. The decoder/player system uses transmitted information, e.g., encoded images, audio and/or depth map information, captured by the capturing system 101, to adjust visual parameters such as scale, scene geometry, stereoscopic parallax and convergence point while controlling what content is displayed and combining portions of images captured by the forward and rear facing cameras to the extent necessary when position feedback information 701 from headset 710 indicates that the position of the viewers head is turned to the left, right or rear as opposed to being positioned straight ahead as if the viewer were facing in the first direction, e.g., the direction of the football field or stage in front of the capture system.

In some embodiments the decoder decodes the full fields 702, 704 representing left and right eye images and then outputs only those portions 703, 705 of the images for display on left and right displays of the head mounted viewer 710 the user would be expected to see if his/her head is positioned in the direction indicated by feedback information 701. However, in other embodiments, the decoder apparatus 604 decodes and/or renders for display only the portions 703, 704 of the images which are to be supplied to the headmounted display 710 for viewing or some other limited portion of the images 702, 703. As should be appreciated the images output to the display 710 will be a composite of forward and rear image portions when a user turns his head by 90 degrees to the left or right and will include purely rear facing image data when the user turns his or her head 180 degrees to the rear. In order to minimize edge effects and provide a lifelike experience, in some embodiments the portions of images corresponding to the rear facing images is subject to luminance adjustments based on the luminance of the image corresponding to the first camera direction, e.g., forward facing direction. Thus, an image or portion of an image captured at a different time or with a different camera in the second direction will be displayed with a luminance intensity determined from the image captured in the first direction. In this manner, even if a rear image was captured in the morning with a different light intensity than the rear it may be combined with a portion of a forward facing image without a sharp change or border being visible. In addition, the luminance level of the images displayed will not vary sharply as a result of the capture and combining processes even if the user turns fully to the rear since the luminosity of the rear image, e.g., the image corresponding to the second image capture direction, will be controlled by the luminosity of the image in the front direction corresponding to the display time to which the image being generated and output corresponds. Thus, while the rear image may have been captured in the morning under different light conditions the luminance will be altered to match and that of the football game being captured via the forward facing cameras at a later time, e.g., during the afternoon or evening time period into which the football game may extend.

In some embodiments the viewer experiences stereoscopic video, orthogonal to view acquired by camera, via a virtual reality head-mounted display device, which reports up to 6-degrees of freedom tracking (yaw, pitch, roll, and optional x, y, z position) back to the player system. The player system applies this data to refresh the visual parameters of the displayed video such that the user can "look around" within the video information. Only the appropriate portion of the acquired video is displayed to the user at any one time, relative to where they are looking and the position of their head.

Figure 8:
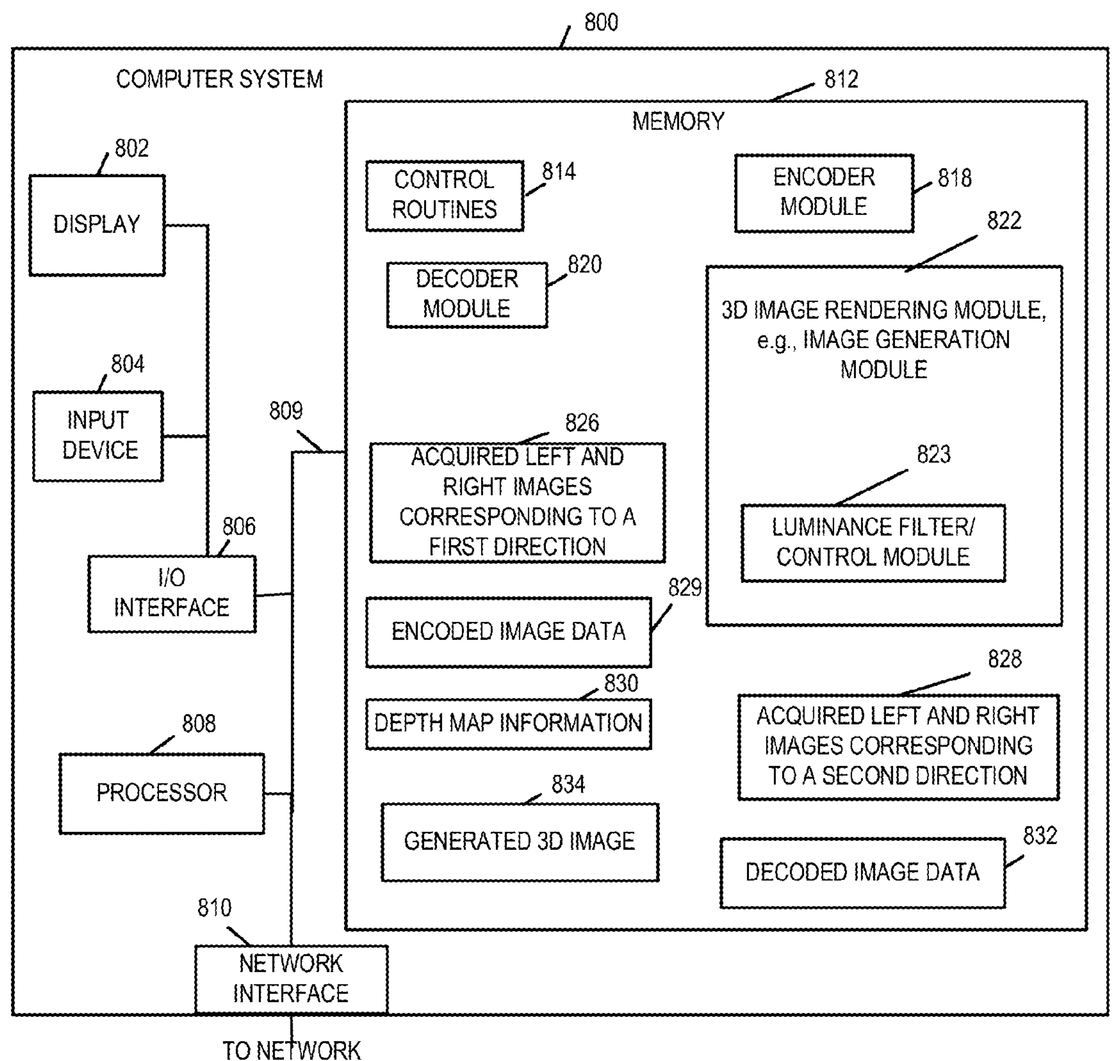
FIG. 8 illustrates an apparatus, e.g., a computer system, which may be used to perform processing including encoding, storage, transmission and/or output of the captured stereoscopic content in accordance with the invention.
Figure 9:
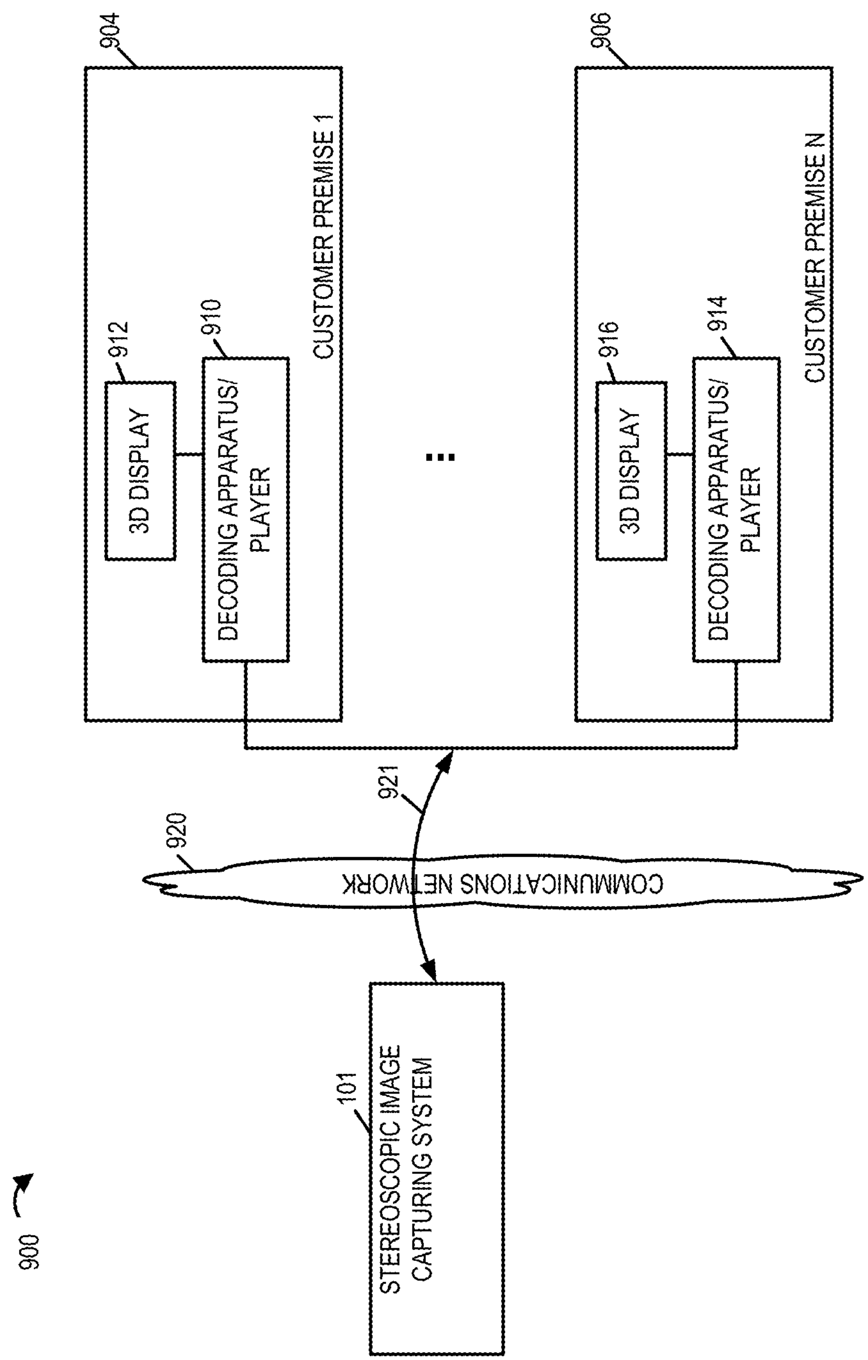
FIG. 9 illustrates an exemplary system implemented in accordance with some embodiments of the invention.

FIG. 8 illustrates a computer system 800 or other hardware implemented in accordance with the present invention which may be used to perform immersive stereoscopic video acquisition, encoding, storage, and transmission and/or output in accordance with the process illustrated in FIGS. 1-7. The system shown in FIG. 8 may be used as the capture system 101 and includes the ability to decode and display encoded image data produced for presentation to a system operator who is responsible for ensuring the quality of the 3D image data being captured, encoded and transmitted.

It should be appreciated that while the system 800 can be used as a capture system, it also serves as a playback device. A playback device at a customer premise location would include the same or similar elements of the system 800 but with some of the capture related features being omitted and encoded data being received from a communications network or other device. Thus, the system 800 supports both a capture system and playback device in the same figure. Since the computer system 800 is a playback device a separate customer premise playback device will not be discussed or described in detail with the playback device 800 being used to enable and support a playback device generally regardless of whether it be located at an image capture site or customer playback site such as a home or office.

The system 800 can perform signal reception, decoding, display and/or other operations in accordance with the invention. In some embodiments the computer system 800 is used in the stereoscopic image capturing apparatus 101 as the computer system 108.

The system 800 includes a display 802, input device 804, input/output (I/O) interface 806, a processor 808, network interface 810 and a memory 812. The various components of the computer system 800 are coupled together via bus 809 which allows for data to be communicated between the components of the system 800.

The memory 812 includes various modules, e.g., routines, which when executed by the processor 808 control the computer system 800 to implement the immersive stereoscopic video acquisition, encoding, storage, and transmission and/or output methods in accordance with the invention. The memory 812 includes control routines 814, an encoder module 818, a decoder module 820, a 3D image rendering module also referred to as a 3d image generation module 822, captured left and right images corresponding to the first direction 826, captured left and right images corresponding to the second direction 828, encoded image data 829, depth map information 830, decoded image data 832 and generated 3D image content 834. The 3D image rendering module 822 generates left and right eye images as a function of a position of a user's head, e.g., the angle left or right the user turns his/her head which is provided as feedback information from the display to the rendering module 822. To the extent that the viewing area to which a user directs his/her attention is to the side, the rendering module will combined portions of front and rear images to generate the images, one for the user's left eye and one for the user's right eye, to be output to the display. Luminance filter/control module 824 controls the luminance of each generated image. When combining front and rear image portions, e.g., corresponding to a left eye view, the luminance filter in some embodiments gives greater weight to the luminance intensity of the front image portion and adjusts the luminance of the rear image portion to bring it closer to that of the front image portion. The luminance of the rear image portion is reduced when it is greater than that of the front image portion with, in some embodiments, the maximum luminance being limited to the maximum luminance of the front image portion. Thus, a bright area of a rear image portion will be reduced as necessary so that it is not brighter than the brightest area of the front image portion with which it is combined. A neighborhood filter is used in some embodiments to filter luminance values of pixels with luminance values of pixels corresponding to the front image being given greater weight than luminance values of the rear image portion with which a front image portion is combined. In this manner, as a result of filtering and/or other techniques such as setting the max luminance value of the rear image portion to be equal or less than the max luminance value of the front image portion, sharp edges or changes in brightness are avoided at the seams where front and rear image portions are stitched together and a user's focus is maintained on the front image area which includes the main content of interest with the rear image area.

The encoder module 818 encodes the acquired image content (e.g., image content 826, 828) to generate encoded image data 829. The encoding related processing shown in FIG. 5 may be, and in some embodiments is, performed by the encoder module 818. The encoded content 829 can be streamed to one or multiple different devices via the network interface 810. The image content to be encoded can also be streamed through network interface 810. The decoder module 820 can be used to decode encoded image content to produce decoded image data 834.

The 3D image generation module 822 generates 3D image in accordance with the features of the invention, e.g., based on at least a portion of one of the left and right images corresponding to the first direction and at least a portion of one of the left and right images corresponding to the second direction. In some embodiments the 3D image generation module 822 uses the decoded image content 832 to generate the 3D image content 834 which is the output of the 3D image generation module 822. The rendering module 824 renders the 3D image content 834 to the display 802. In some embodiments the display device 802 may be a 3D display such as an oculus rift. In this manner an operator of system 800 can view the result of the processing in the form of 3D image content generated using images captured by the cameras of the capturing system 101. The operator may control one or more parameters via input device 804 and/or select operations to be performed, e.g., select to display 3D image.

The captured left and right images corresponding to the first direction 826 include images captured by the cameras facing the first viewing direction, e.g., forward viewing direction, such as the cameras 104, 106 of FIG. 1. The captured left and right images corresponding to the second direction 828 include images captured by the rear cameras facing the second direction, e.g., backward direction, such as the cameras 110, 112 of FIG. 1.

FIG. 1 illustrates an exemplary system 900 implemented in accordance with some embodiments of the invention. The system 900 supports content delivery, e.g., imaging content delivery, to one or more customer devices, e.g., playback devices/content players, located at customer premises. The system 900 includes the exemplary stereoscopic image capturing system 101, a communications network 920, and a plurality of customer premises 904, 906. The stereoscopic image capturing system 101 captures and processes imaging content in accordance with the features of the invention which are discussed in more detail in FIG. 10 flowchart. The communications network may be, e.g., a hybrid fiber-coaxial (HFC) network, satellite network, and/or internet.

The stereoscopic image capturing system 101, the elements of the system 101 and various processing steps performed in accordance with some embodiments are discussed in FIGS. 1-7. Via the network 920, the stereoscopic image capturing system 101 can send and/or exchange information with the devices located at the customer premises 904, 906 as represented in the figure by the link 921 traversing the communications network 920.

Each customer premise 904, 906 may include a plurality of devices/players, e.g., decoding apparatus for decoding the imaging content transmitted by the capturing system 101. Customer premise 1 904 includes a decoding apparatus/player 910 coupled to a 3D display device 912 while customer premise N 906 includes a decoding apparatus/player 914 coupled to a 3D display device 916. In various embodiments decoding apparatus 910, 914 present the 3D imaging content on the corresponding display devices 912, 916. The decoding apparatus/players 910, 914 may be devices which are capable of decoding the imaging content transmitted by the capturing system 101, generate 3D imaging content using the decoded content and rendering 3D imaging content on the display devices 912, 916. Any of the decoding apparatus/players 910, 914 may be used as the decoding apparatus/player 604 shown in FIGS. 6-7. A computer system such as the one illustrated in FIG. 8 can be used as the decoding apparatus/players 910 and 914, however when implemented as a decoder apparatus/player the computer system 800 may not necessarily have encoding capabilities in some embodiments.

Figure 10:
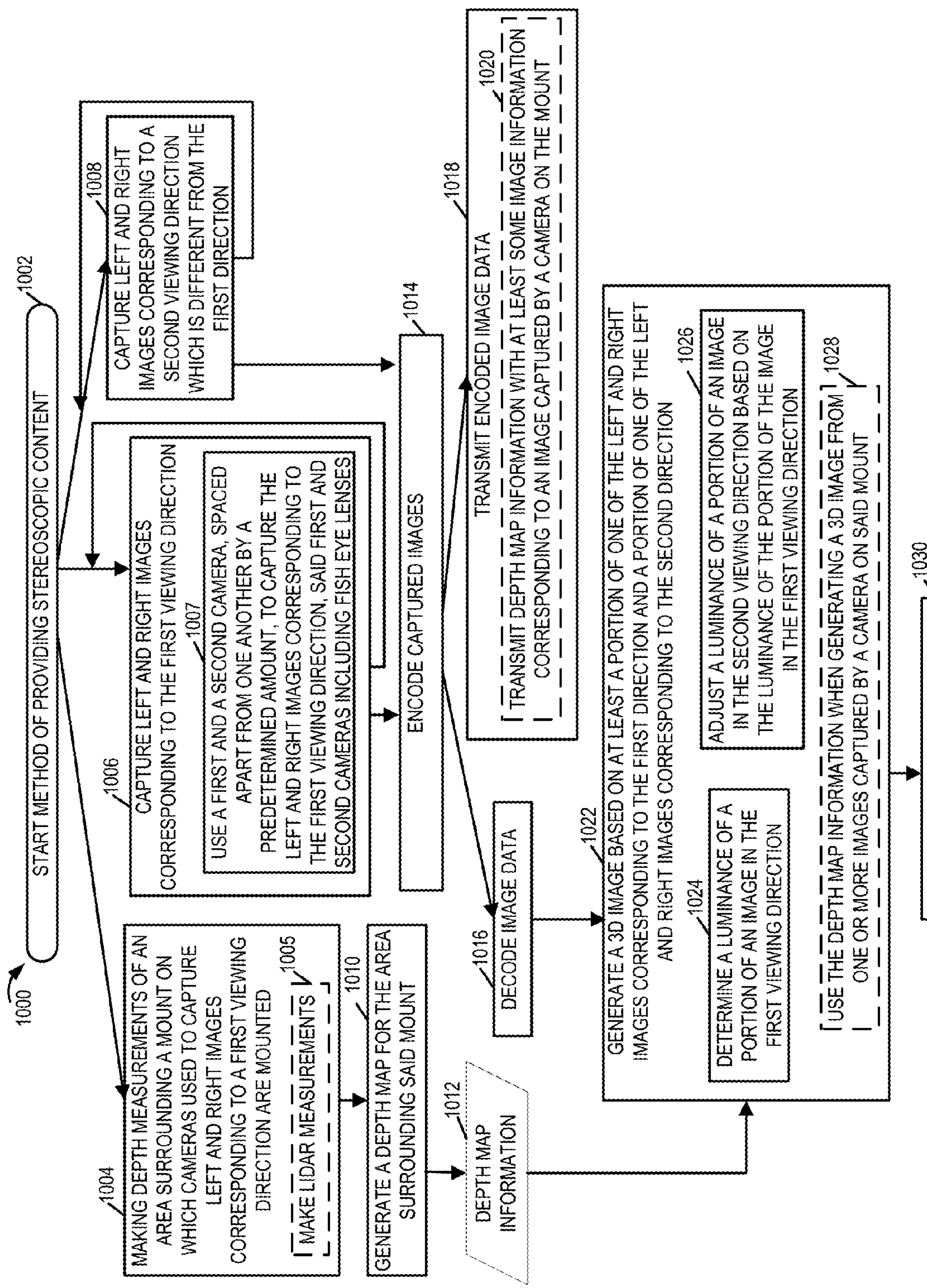
FIG. 10 is a flowchart illustrating the steps of an exemplary method of providing 3D content in accordance with an exemplary embodiment implemented using the capturing system shown in FIG. 1.

FIG. 10 is a flowchart 1000 illustrating the steps of an exemplary method of providing 3D content, in accordance with an exemplary embodiment. The method of flowchart 1000 is implemented in some embodiments using the capturing system shown in FIG. 1.

The method starts in step 1002, e.g., with the capturing system, e.g., camera system, being powered on. The method proceeds from start step 1002 to steps 1004, 1006 and 1008.

In step 1004 the capturing device makes depth measurements of an area surrounding a mount, e.g., mount 103, on which cameras used to capture left and right images corresponding to a first viewing direction are mounted. In some embodiments the depth measurements are performed using LIDAR scanning. In such embodiments step 1005 is performed as part of step 1004. In step 1005 the image capturing device makes LIDAR measurements scanning the surrounding area of the scene being captured to perform depth measurements. Operation proceeds from step 1004 to step 1010 wherein the capturing device generates a depth map of the area surrounding the mount, e.g., using the depth measurements. The output of step 1010 is the depth map information 1012 which may, and in some embodiments is, used for performing further processing of captured image content in accordance with the invention. The depth map information 1012 is supplied as an input to be used in performing such processing as discussed below.

Returning to step 1006. In step 1006, which is performed on an ongoing basis, the capturing device captures left and right images corresponding to a first viewing direction. In some embodiments as part of step 1006, step 1007 is performed wherein the left and right images corresponding to a first viewing direction are captured using the first and second cameras which are spaced apart from one another by a predetermined amount to capture the left and right images. In some embodiments the first and second cameras include fish eye lenses. In some embodiments the fish eye lenses capture an image corresponding to a 180 degree viewing area or approximately a 180 degree viewing area. In some embodiments the fish eye lenses capture an image corresponding to at least a 120 degree viewing area. Operation proceeds from step 1006 to step 1014.

Returning to step 1008. In step 1008, which is also performed on an ongoing basis in some embodiments, the capturing device captures left and right images corresponding to a second viewing direction which is different from the first direction. In various embodiments the first viewing direction is a forward direction relative to first and second cameras used to capture the left and right images and the second viewing direction is a rear direction relative to the first and second cameras used to capture the left and right images. Operation proceeds from step 1006 to step 1014. In some embodiments the rate at which images are captured in the first viewing direction is different than the rate at which images are captured in the second viewing direction.

Returning to step 1014. In step 1014 the captured images are encoded in accordance with the features of the invention. In some embodiments the captured images are encoded along with depth map information 1012 generated in step 1010 or alternatively the depth map information 1012 is encoded separately. Operation proceeds from step 1014 to steps 1016 and 1018 which may be performed in parallel in some embodiments. In some other embodiments where a operator capturing the images wants to view 3D image generated using the captured images prior to transmission of image content, e.g., to another device, processing along the path of steps 1016, 1024 and 1030 is performed prior to step 1018 being performed. Thus by performing steps 1016, 1022 and 1030 the operator can get an idea of how a device on the other end receiving the encoded image data will be able to generate 3D image content using the received encoded image data.

In step 1016 the encoded image content is decoded, e.g., by a decoder included in the computer system included in the capturing system 101. Operation proceeds from step 1016 to step 1022 where 3D image content is generated after the decoding operation. In step 1022, the system generates a 3D image based on at least a portion of one of the left and right images corresponding to the first direction and at least a portion of one of the left and right images corresponding to the second direction. In some embodiments as part of step 1022, one or more of steps 1024, 1026 and 1028 are performed. In step 1024 a luminance of a portion of an acquired image in the first viewing direction is determined. In step 1026 a luminance of a portion of an image in the second viewing direction, e.g., rear direction, is adjusted based on the luminance of the portion of the image in the first viewing direction. In some embodiments the process in steps 1024 and 1026 are performed to modify the background image data so that the 3D images are generated such that the 3D viewing experience of a user at a given time does not suddenly change as the user rotates his head and begins seeing portions of the rear area behind the image capture system which may have been captured at a different time and/or under different lighting conditions than the forward facing image with which it is being combined or from which the user has shifted his viewing to to the side or rear.

In step 1028, which is optional and performed in some embodiments, the capturing device uses the depth map information 1012 when generating the 3D image from one or more images captured by a camera on the mount. Thus in some embodiments the depth information 1012 is used along with the captured left and/or right image corresponding to the first and second direction to generate the 3D image.

Operation proceeds from step 1022 including the above discussed steps to step 1030 where the 3D image is displayed on a display, e.g., a 3D display device. In some embodiments operation proceeds from step 1026 to step 1028.

Returning to step 1018. In step 1018 the encoded image content is transmitted, e.g., to another device. In some embodiments step 1020 is performed as part of transmission step 1018. In step 1020 the depth map information is transmitted with at least some image information corresponding to an image captured by a camera on the mount.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method of providing 3D content, comprising:

capturing, at a first time, a first image pair including left and right images corresponding to a first viewing direction;

capturing, at a second time, a second image pair including left and right images corresponding to a second viewing direction which is different from said first viewing direction, said second time being different from said first time; and generating a stereoscopic image pair based on at least a portion of one of the left and right images of the first image pair corresponding to the first viewing direction and at least a portion of one of the left and right images of the second image pair corresponding to the second viewing direction, said generating including:

determining a luminance of a portion of at least one of the left and right images of the first image pair corresponding to the first viewing direction; and adjusting a luminance of at least a portion of one of the left and right images of the second image pair corresponding to the second viewing direction based on the determined luminance of the portion of the at least one of the left and right images of the first image pair corresponding to the first viewing direction.

2. The method of claim 1 wherein capturing, at a first time, a first image pair including left and right images corresponding to a first viewing direction includes using first and second cameras spaced apart from one another by a predetermined amount to capture the left and right images of the first image pair corresponding to the first viewing direction, said first and second cameras including fish eye lenses.

3. The method of claim 2, wherein said fish eye lenses capture an image corresponding to a 180 degree viewing area or approximately a 180 degree viewing area.

4. The method of claim 2, wherein said fish eye lenses capture an image corresponding to at least a 120 degree viewing area.

5. The method of claim 2, wherein the first viewing direction is a forward direction relative to the first and second cameras used to capture said left and right images of the first image pair and the second viewing direction is a rear direction relative to the first and second cameras used to capture said left and right images of the first image pair.

6. A method of providing 3D content, comprising:

capturing, at a first time, a first image pair including left and right images corresponding to a first viewing direction;

capturing, at a second time, a second image pair including left and right images corresponding to a second viewing direction which is different from said first viewing direction, said second time being different from said first time; and generating a stereoscopic image pair corresponding to the second viewing direction based on at least a portion of one of the left and right images of the first image pair corresponding to the first viewing direction and at least a portion of one of the left and right images of the second image pair corresponding to the second viewing direction, said generating including:

determining a luminance of a portion of an image of the generated stereoscopic image pair corresponding to the second viewing direction, based on a luminance of at least one of the left and right images of the first image pair corresponding to the first viewing direction.

7. The method of claim 6, further comprising:

capturing additional left and right images corresponding to the first viewing direction at a video frame rate.

8. The method of claim 7, further comprising:

capturing additional left and right images corresponding to the second viewing direction at a second rate which is lower than said video frame rate.

9. The method of claim 8, wherein said second rate is less than ⅕ said video frame rate.

10. The method of claim 9, wherein capturing left and right images corresponding to the second viewing direction which is different from said first viewing direction is performed using lower resolution cameras than is used to capture images in the first viewing direction.

11. The method of claim 1, further comprising:

making depth measurements of an area surrounding a mount on which cameras used to capture said left and right images of the first image pair corresponding to the first viewing direction are mounted.

12. The method of claim 11, wherein making depth measurements of an area surrounding a mount includes making LIDAR measurements.

13. The method of claim 12, further comprising:

generating a depth map for the area surrounding said mount; and transmitting depth map information with at least some image information corresponding to an image captured by a camera on said mount.

14. The method of claim 13, further comprising:

using said depth map information when generating a stereoscopic image pair from one or more images captured by a camera on said mount.

15. A playback device, comprising:

a receiver for receiving a first image pair including left and right images corresponding to a first viewing direction and a second image pair including left and right images corresponding to a second viewing direction which is different from said first viewing direction; and a renderer for rendering a stereoscopic image pair based on at least a portion of one of the left and right images of the first image pair corresponding to the first viewing direction and at least a portion of one of the left and right images of the second image pair corresponding to the second viewing direction; and a luminance controller for controlling the luminance of a portion of an image corresponding to the second viewing direction based on the luminance of a portion of an image corresponding to the first viewing direction when combining image portions corresponding to said first and second viewing directions as part of the image rendering process; and a display device for displaying left and right eye images generated by said rendering.

16. A system for providing 3D content, comprising:

a first camera for capturing left and right images corresponding to a first viewing direction;

a second camera for capturing left and right images corresponding to a second viewing direction which is different from said first viewing direction; and a player for rendering a stereoscopic image pair based on at least a portion of one of the left and right images corresponding to the first viewing direction and at least a portion of one of the left and right images corresponding to the second viewing direction, said player including a luminance control module for controlling the luminance of a rear portion of an image based on the luminance of a front portion of an image when combining front and rear image portions as part of the image rendering process; and left eye and right eye display portions of a display for displaying left and right eye images generated by said rendering.

17. The system of claim 16, wherein said luminance control module limits a maximum luminance value of the rear image portion to be equal to or less than a maximum luminance value of the front image portion being included in a rendered image.

18. The system of claim 17, wherein the luminance of a left front image portion is used by said luminance control module to control the luminance of a left rear image portion.

19. The system of claim 18, wherein front and rear image portions which are combined by said rendering module when a user's head is turned to a left or right side are images which were captured at different points in time.

20. The playback device of claim 15, wherein one of said first and second viewing directions is a rear direction.

21. The playback device of claim 15, wherein the portion of one of the left and right images of the first image pair corresponding to the first viewing direction was captured at a different time from said at least a portion of one of the left and right images of the second image pair corresponding to the second viewing direction.

* * * * *